UNITED STATES PATENT OFFICE.

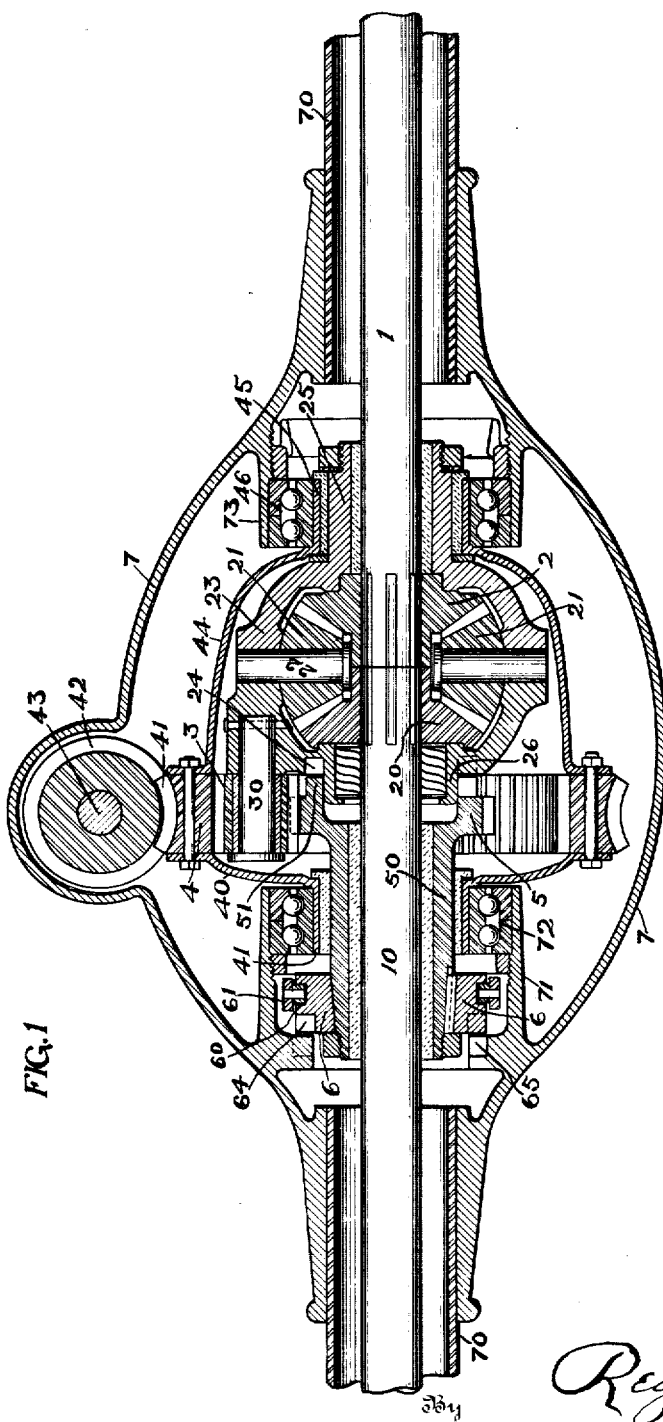

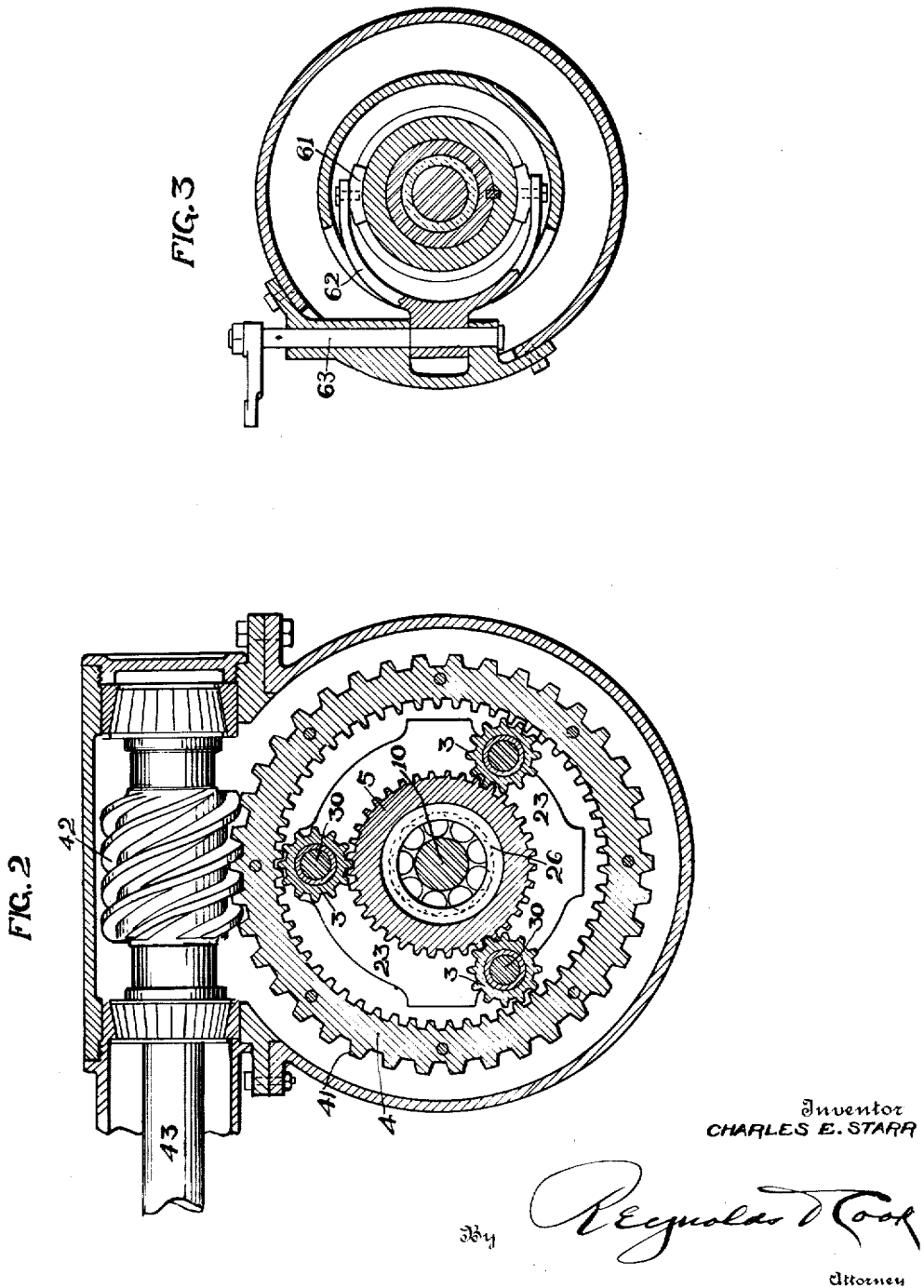

CHARLES E. STARR, OF SEDRO WOOLLEY, WASHINGTON, ASSIGNOR TO PERFECTO GEAR DIFFERENTIAL CO., OF SEATTLE, WASHINGTON, A CORPORATION OF WASHINGTON.

DRIVING MECHANISM FOR MOTOR-VEHICLES.

1,362,360.

Specification of Letters Patent.  Patented Dec. 14, 1920.

Application filed April 28, 1919. Serial No. 293,189.

*To all whom it may concern:*

Be it known that I, CHARLES E. STARR, a citizen of the United States, and resident of Sedro Woolley, county of Skagit, and State of Washington, have invented certain new and useful Improvements in Driving Mechanism for Motor-Vehicles, of which the following is a specification.

My invention relates to a device which employs in combination a differential and a planetary gear system, whereby an additional change in speed may be secured by the action of mechanisms which are simple, compact, reliable and efficient.

The object of my invention is to combine with a differential, for such purposes as driving of automobiles a mechanism by which an additional change in speed may be secured, and to have the entire device simple and compact. The invention consists of the combination of parts, which will be hereinafter described and then defined by the claims which terminate this specification.

In the accompanying drawings I have illustrated my device embodied in the form of construction which I now most prefer to use.

Figure 1 is a longitudinal section taken upon the plane of the differential shafts or axles.

Fig. 2 is a transverse section taken through the gears of the planetary system, the same being substantially on the plane of the transmission shaft.

Fig. 3 is a transverse section taken on the plane of the shifting fork.

In the drawings 1 and 10 represent the differential shafts which may be two stub shafts of an automobile rear axle. These shafts have their ends abutting. These are connected by a differential which is, or may be, of a standard construction. The differential shown consists of two beveled gears 2 and 20, intermediate beveled gears 21 which are mounted to turn upon pins 22 carried by frame or casing 23. This part 23 I have called a master ring, although in its physical aspect it most nearly resembles a casing; nevertheless its primary function is to carry its intermediate pinions 21, and to turn, or to be held stationary, in accordance with the necessity of the case, in order to secure the necessary differential action. This ring 23, instead of having a driving gear secured thereto, has a series of journal pins 30, upon which pinions 3 are mounted, these pinions 3 being the intermediate gears of a planetary gear system. As shown in Fig. 2, three of these pinions are used; the numbers of these may be varied in accordance with the necessity or desire.

The outer or master gear 4 of the planetary system is secured to a web 40 which is provided with a sleeve 41 upon which it turns. The inner gear 5 of the planetary system is carried by one end of a sleeve 50, which sleeve is mounted to turn freely upon one of the shafts or axles 10. The master gear 4 of the planetary system is the member through which the power is communicated to drive the axles 1 and 10. The power for turning the combined gear system is primarily applied to the master gear 4. The manner of doing this is in one sense immaterial. As illustrated I have provided the outer surface of the gear 4 with worm teeth 41, and these are engaged by a worm 42 carried by a transmission shaft 43.

The inner end of the sleeve 50 is provided with a set of lugs 51 which are adapted to intermesh with other lugs or recesses carried by the casing 23 of the differential. One of such recesses is shown at 24 in Fig. 1. In the position of the sleeve 50 and gear 5, as shown in Fig. 1, the above parts are not in engagement, in consequence, they are free to rotate at different speeds. If, however, the gear 5 be moved over toward the differential, so as to enter the lugs 51 in the recesses 24, in the casing 23, this gear will be locked so as to turn with the casing 23, that is, with the master ring of the differential.

At the opposite end of the sleeve 50 a shifting collar 6 is provided. This has a groove 60 in its outer periphery, in which are mounted blocks 61 which are pivotally connected with a yoke 62 secured to a shaft 63. By oscillating this shaft, the collar 6, and with it the sleeve 50 and its attached gear 5, may be moved lengthwise so that the recesses 64 which form lugs at one end thereof may be engaged with corresponding recesses or lugs 65 carried by some fixed member, herein shown as carried by the outer casing 7, which incloses the entire mechanism herein described. This casing 7 is herein shown as to be secured to the shaft housings 70 which inclose the differential shafts 1 and 10.

If the sleeve 50 be shifted toward the left hand as the device is shown in Fig. 1, the collar 6 will be engaged with lugs 65 so as to hold this sleeve and attached gear against turning. In this case the intermediate pinions 3 will be caused to travel around the gear 5, carrying with it the master ring or casing 23 of the differential. If the sleeve 50 be shifted in the opposite direction so as to engage the lugs 51 with the lugs 24, carried by the master ring 23 of the differential, the planetary system will be locked so as to revolve as one piece with the master ring of the differential.

The casing 7 has an internally extending sleeve 71 within which is mounted a bearing 72 for the sleeve 50. This sleeve 50 in turn forms a bearing for the shaft 10. A casting 44 is secured to one side of the master gear 4 of the planetary system and incloses the differential. This may form, with the disk 40 and ring 4, a closed casing for the differential, or be an open work spider. At its outer end this casting has a sleeve 45 to which is secured one-half of a bearing 46, the other half of which bearing is carried by a sleeve 73 which extends inwardly from the outer casing 7. The casing or frame 23 which acts as the master ring of the differential, also has a sleeve 25 which has a bearing within the sleeve 45 and also has a bearing for the shaft 1.

The master ring of the differential in the construction illustrated may function as an inclosing casing. It is provided with, or has secured thereto, two rotative bearings, one consisting of the sleeve 25 and the other of the sleeve 26. The latter is indicated as being a roller bearing. The sleeve 50 through the shifting of which the change of speed is secured, has a flange 51 which is journaled upon the outer surface of the sleeve 26.

By the above construction is provided a compact mechanism of such character as to be reliable and to have ample wearing surfaces, through the means of which another change in speed ratio may be employed for driving automobiles. It is not intended ordinarily to substitute this device for the usual speed varying mechanism, but to add the same thereto.

What I claim as my invention is:

1. The combination with a differential gear system, of a planetary gear system having its intermediate gears secured to turn with the master ring of the differential, and means for optionally locking the inner gear of the planetary gear system to turn with the master ring of the differential or to hold it against turning.

2. The combination with a differential gear system having a master ring journaled upon the shafts, a planetary gear system having its intermediate gears carried by said master ring and its inner gear journaled upon the shaft to permit a limited movement lengthwise of the shaft, said inner gear and the master ring of the differential having engageable clutch members, a fixed member having, with the said inner gear engageable clutch members, and means for shifting said inner gear to engage it with said master ring or the fixed member as desired.

3. In a power transmission device, in combination, a differential having a revoluble casing upon which the intermediate gears are mounted, a planetary gear system placed co-axial with the differential and having its intermediate gears mounted upon said revoluble differential casing, the central gear of the planetary system having a sleeve secured thereto, and having a differential shaft journaled therein, an external bearing for said sleeve, each end of the sleeve having one-half of an interlocking clutch, the casing of the differential having complemental clutch members and second complemental clutch members adapted to be engaged by the other end of the sleeve, and a shifting mechanism engaging said sleeve.

4. The combination with a pair of axles, a gear case, and differential gears mounted in said case and connecting the axles, of a planetary gear system having its central gear mounted loosely upon and movable lengthwise of one of the axles, means for locking said central gear to turn with the gear case at one end of its movement on the shaft and for locking it against turning at the other end of its movement lengthwise of the shaft, the intermediate gears of the planetary gear system being mounted to turn with the master wheel of the differential, and means for transmitting power to the outer gear of said planetary gear system.

Signed at Seattle, Washington, this 7 day of April, 1919.

CHARLES E. STARR.